(12) United States Patent
Brucker et al.

(10) Patent No.: US 10,618,750 B2
(45) Date of Patent: Apr. 14, 2020

(54) TRANSPORT DEVICE IN THE FORM OF A LONG-STATOR LINEAR MOTOR HAVING A TURNAROUND PORTION

(71) Applicant: B&R INDUSTRIAL AUTOMATION GMBH, Eggelsberg (AT)

(72) Inventors: Michael Brucker, Weissenkirchen i.A. (AT); Stefan Huber, Salzburg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 16/197,977

(22) Filed: Nov. 21, 2018

(65) Prior Publication Data
US 2019/0161292 A1    May 30, 2019

(30) Foreign Application Priority Data

Nov. 24, 2017 (EP) ..................................... 17203501

(51) Int. Cl.
*B65G 54/02* (2006.01)
*B60L 13/03* (2006.01)
*H02K 41/02* (2006.01)

(52) U.S. Cl.
CPC .............. *B65G 54/02* (2013.01); *B60L 13/03* (2013.01); *H02K 41/02* (2013.01); *B65G 2811/0668* (2013.01)

(58) Field of Classification Search
CPC .................... B65G 54/02; B65G 43/00; B65G 2811/0673; B65G 2811/0668; H02K 41/02; B60L 13/03

(Continued)

(56) References Cited

U.S. PATENT DOCUMENTS 6,876,107 B2    4/2005   Jacob
8,863,669 B2 *  10/2014  Young .................. B60L 15/005
                                            104/292

(Continued)

FOREIGN PATENT DOCUMENTS

DE      19817099       10/1999
EP      3 109 998      12/2016

(Continued)

OTHER PUBLICATIONS

Europe Search Report/Office Action conducted in counterpart Europea Appl. No. 17203501.6 (dated May 16, 2018).

*Primary Examiner* — James R Bidwell
(74) *Attorney, Agent, or Firm* — Greenblum & Bernstein, P.L.C.

(57) ABSTRACT

Transport device having a transport route, with a turnaround portion to change orientation of a transport unit by 180° in the longitudinal direction along the transport route, including a turnaround portion with an entrance connected to a first transport route portion by a first entrance end and a second, open entrance end, and an exit connected to a second transport route portion by a first exit end and a second, open exit end. A common movement path is formed at least in some portions in a region of a first transfer position, and the transport unit is movable along the path. To be turned around, the transport unit is moved to the entrance of the turnaround portion, transferred from the entrance to the exit of the turnaround portion, and moved from the exit of the turnaround portion.

17 Claims, 7 Drawing Sheets

(58) Field of Classification Search
USPC .......................................... 198/805, 400, 412
See application file for complete search history.

(56) References Cited

U.S. PATENT DOCUMENTS

| | | | |
|---|---|---|---|
| 10,246,266 B2* | 4/2019 | Weber | .................... B60L 13/03 |
| 2003/0230941 A1* | 12/2003 | Jacobs | .................... B60L 15/38 |
| | | | 310/12.19 |
| 2010/0236445 A1* | 9/2010 | King | .................... B60L 13/003 |
| | | | 104/130.03 |
| 2011/0125307 A1* | 5/2011 | Dickson | ................ B23P 21/004 |
| | | | 700/112 |
| 2013/0074724 A1 | 3/2013 | King et al. | |
| 2015/0083018 A1* | 3/2015 | Clark | .................... B60L 13/003 |
| | | | 104/282 |
| 2016/0380562 A1 | 12/2016 | Weber et al. | |
| 2017/0225900 A1 | 8/2017 | Radak et al. | |
| 2017/0320683 A1 | 11/2017 | Walter et al. | |

FOREIGN PATENT DOCUMENTS

| | | |
|---|---|---|
| EP | 3 202 611 | 8/2017 |
| EP | 3 243 772 | 11/2017 |
| JP | S63-99701 | 5/1988 |
| WO | 2004/103792 | 12/2004 |
| WO | 2013/143783 | 10/2013 |
| WO | 2014/047104 | 3/2014 |
| WO | 2018/161160 | 9/2018 |

* cited by examiner

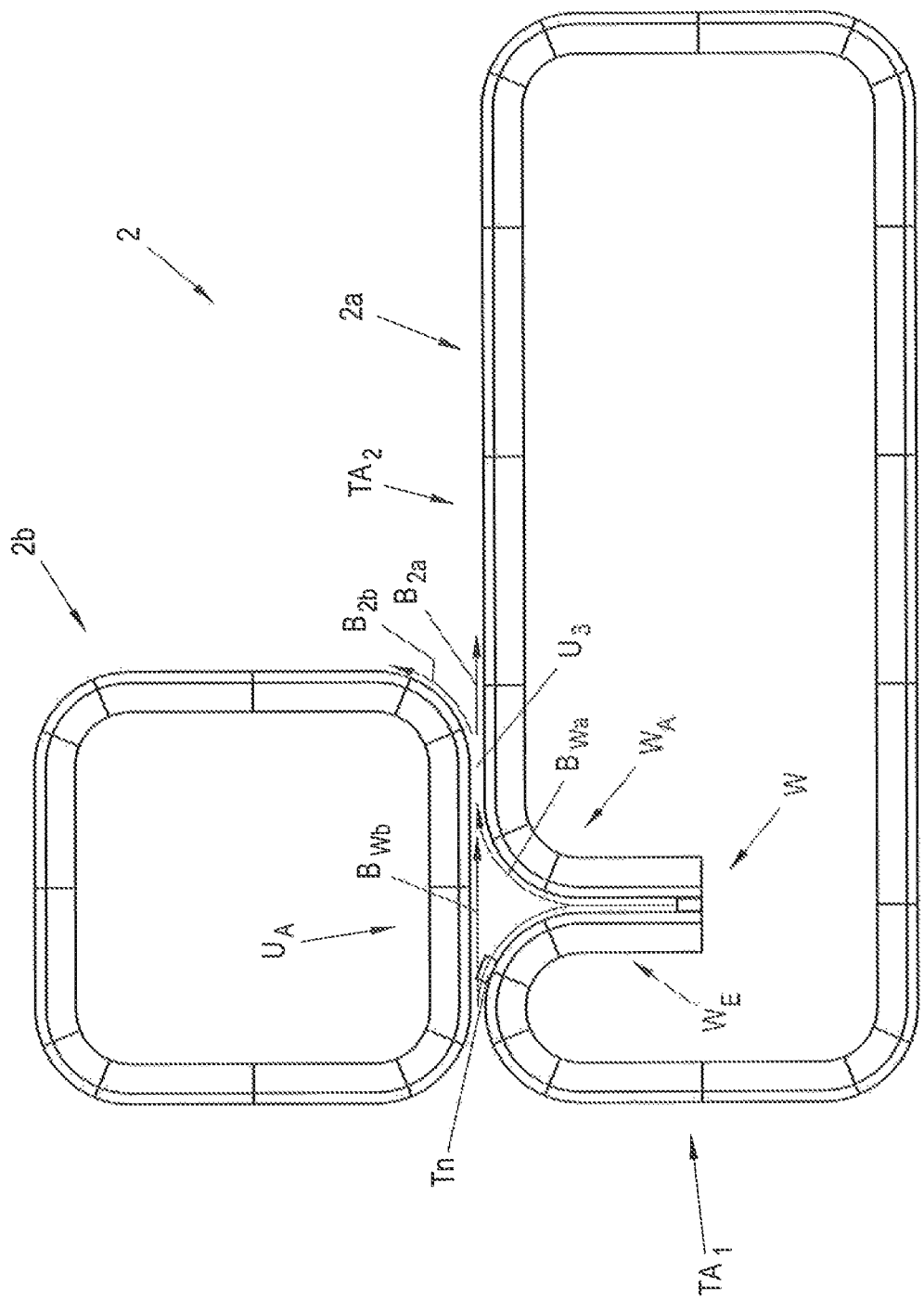

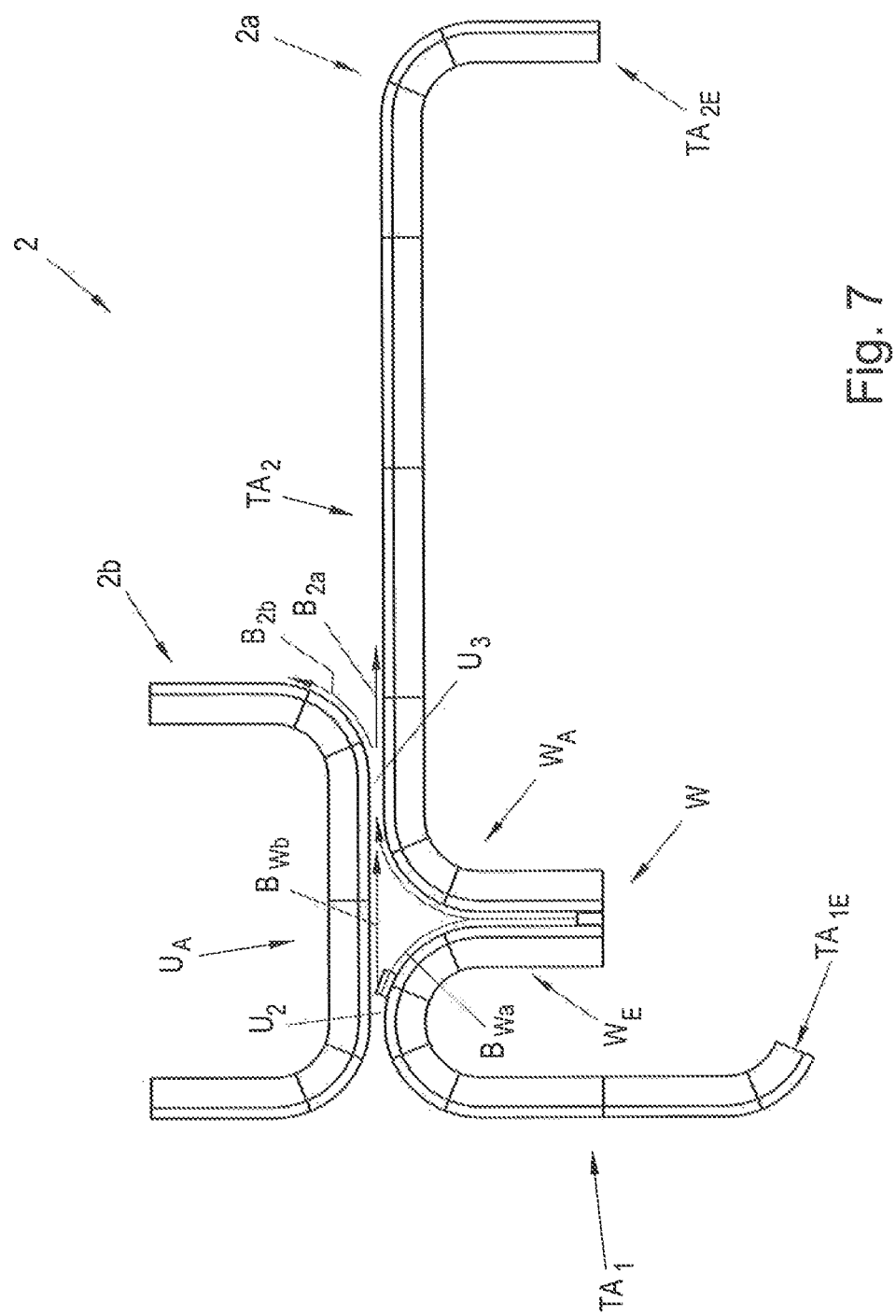

TRANSPORT DEVICE IN THE FORM OF A LONG-STATOR LINEAR MOTOR HAVING A TURNAROUND PORTION

CROSS-REFERENCE TO RELATED APPLICATIONS

The present application claims priority under 35 U.S.C. § 119(a) of European Patent Application No. EP 17203501.6 filed Nov. 24, 2017, the disclosure of which is expressly incorporated by reference herein in its entirety.

BACKGROUND OF THE INVENTION

1. Field of the Invention

The invention relates to a transport device in the form of a long-stator linear motor, comprising a transport route and at least one transport unit, which can be moved in the longitudinal direction along the transport route. The invention also relates to a method for turning around a transport unit of a transport device in the form of a long-stator linear motor.

2. Discussion of Background Information

In practically all modern production facilities, it is necessary to move parts or components, even over relatively long transport routes, between individual handling or production stations using transport devices, To do so, a number of transport or conveyor devices are known. Continuous conveyors in various designs are often used for this purpose. Conventional continuous conveyors are conveyor belts in various embodiments, in which a rotary movement of an electrical drive is converted into a linear movement of the conveyor belt. When using conventional continuous conveyors of this kind, flexibility is considerably restricted; in particular, it is impossible to transport individual transport units separately. To remedy this and deal with the requirements of modern, flexible transport devices, what are known as long-stator linear motors (LLM) are being used more and more as a replacement for conventional continuous conveyors.

In long-stator linear motors, a plurality of electrical propelling coils, which form the stator, are arranged in a stationary manner next to one another along a transport route. A number of propelling magnets, either in the form of permanent magnets or an electrical coil or cage winding, are arranged on a transport unit and interact with the propelling coils. The magnetic or electromagnetic fields of the propelling magnets and propelling coils interact in order to generate a propelling force on the transport unit, moving the transport unit forwards. The long-stator linear motor can be designed as a synchronous machine, either self-excited or separately excited, or as an asynchronous machine, By actuating the individual propelling coils to control the magnetic flux, the magnitude and direction of the propelling force is influenced, and the transport unit can be moved along the transport route in the desired direction and in the desired manner. In the process, it is also possible to arrange a plurality of transport units along the transport route and to control their movements separately and independently of one another by energizing each propelling coil interacting with a transport unit, generally by applying an electrical voltage.

Long-stator linear motors stand out in particular on account of better and more flexible utilization over the entire working range of the movement (position, speed, acceleration), individual open-loop/closed-loop control of the transport units along the transport route, better energy efficiency, lower maintenance costs due to the lower number of parts subject to wear, simple transport unit replacement, efficient monitoring and error detection, and optimized product flow along the transport route. Examples of such long-stator linear motors can be found in WO 2013/143783 A1, U.S. Pat. No. 6,876,107 B2, US 2013/0074724 A1, or WO 2004/103792 A1.

Often, the long stator or a transport route is also constructed in the form of individual route portions, which in turn consist of transport segments joined together. Due to this modular nature, the construction of a long-stator linear motor can be made simpler, in particular if defined route portions and transport segments are used. The structural design of the long-stator linear motor, i.e. the design of the propelling coils, the conveying route, the transport units, or the guides for the transport units, etc., can of course vary, but the basic principle of operation of the long-stator linear motor is always the same.

Generally, such transport devices in the form of a long-stator linear motor are arranged in such a plane that the transport devices are moved along a planar transport route. In this case, the transport route can be composed of transport segments in the form of curve segments, straight lines or even switches. The movement can also take place in a plurality of planes, as disclosed for example in WO 2014/047104 A1.

EP 3 109 998 A1 discloses a method for transferring a transport unit of a transport device in the form of a long-stator linear motor at a switch. This document describes how the currents of propelling coils must be controlled in order to influence the relative power of the forces acting on a transport unit such as to move the transport unit to the desired side at the switch. A drawback is that the flexibility of the orientation of the transport unit along the transport route is restricted.

EP 3 22 611 A1 discloses a method for controlling the movement of a transport unit of a transport device in the form of a long-stator linear motor. In this document, "logical sectors" are formed along a transport route, which sectors can also extend across a plurality of transport segments. As a result, the movement of the transport unit along the transport route can be planned regardless of the underlying hardware. This document does not disclose changing the orientation of a transport unit either.

Due to a predefined production process, for example, it may be desirable for a transport unit to be oriented in a particular manner at one particular work station, for example, and then to be oriented precisely 180° in the opposite direction in another, subsequent work station (in relation to the movement direction of the transport unit). For example, this may be required if a product transported by the transport unit is processed on a first side in a first work step and on the second, opposite side in a second work step. In addition, due to complex route guides, it may not always be possible to ensure the transport unit is oriented in a particular manner, for which reason it may be desirable to change the orientation of the transport unit specifically at a particular point.

SUMMARY OF THE EMBODIMENTS

Embodiments are directed to a transport device in the form of a long-stator linear motor that allows the orientation of a transport unit in the longitudinal direction to be changed, and a method for changing the orientation of a transport unit of a transport device in the form of a long-stator linear motor.

According to the embodiments, the transport route has a turnaround portion, which is provided to change the orientation of the transport unit by 180° in the longitudinal direction along the transport route, the turnaround portion having an entrance, which is connected to a first transport route portion by a first entrance end, and a second, open entrance end, and having an exit, which is connected to a second transport route portion by a first exit end, and a second, open exit end, the entrance and the exit of the turnaround portion forming a common movement path at least in some portions in the region of a first transfer position, the transport unit being movable along said path, and in that, in order to be turned around, the transport unit can be moved from the first transport route portion to the entrance of the turnaround portion, transferred from the entrance to the exit of the turnaround portion at the first transfer position, and moved from the exit of the turnaround portion to the second transport route portion, the first transport route portion, which adjoins the entrance of the turnaround portion, and the second transport route portion of the transport route, which adjoins the exit of the turnaround portion, comprising a coaxial movement path at least in some portions, the transport unit being movable along said path.

Preferably, the entrance of the turnaround portion is designed as a 90° or 180° route portion and the exit of the turnaround portion is designed as a 90° or 180° route portion, one end of the 90° or 180° route portion being connected to the first or second transport route portion and the other end having an open end.

Advantageously, a 90° or 180° route portion is constructed from two curve entrance segments, each having one straight end portion and one curved end portion, and at least one circular arc segment, which connects the two curve entrance segments at the curved portions, and one curve entrance segment of the 90° or 180° route portion is connected to the first or second transport route portion by the straight end portion and the second curve entrance segment has an open end at the straight end portion.

Advantageously, the entrance of the turnaround portion and the exit of the turnaround portion are connected and form a first closed transport route loop.

If the transport route comprises at least two turnaround portions, the orientation of the transport unit can be changed by 180° twice, resulting in greater flexibility of the transport route; for example, by being turned around twice, the transport unit can be oriented back into the original starting position from before the first turnaround portion.

According to another advantageous embodiment of the invention, it is provided that in the region of the turnaround portion, the transport route comprises a transfer portion, which is provided for moving the transport unit from the first transport route portion to the second transport route portion without turning said transport unit around, the transfer portion having a first route portion, which has a common movement path together with the first transport route portion at least in some portions, and having a second route portion, which has a common movement path together with the second transport route portion at least in some portions, the transport unit being able to be transferred from the first transport route portion to the transfer portion at a second transfer position, moved in the longitudinal direction along the transfer portion to the second transport route portion, and transferred from the transfer portion to the second transport route portion at a third transfer position.

Preferably, the transfer portion forms a second, open or closed transport route loop, along which the transfer unit can be moved in the longitudinal direction. This further increases the flexibility of the transport route.

Embodiments are directed to a method in which, in order to be turned around, the transport unit is moved from the first transport route portion to the entrance of the turnaround portion while having a first transport unit end pointing in the movement direction and a second transport unit end pointing counter to the movement direction, is transferred from the entrance to the exit of the turnaround portion at the first transfer position, and is moved from the exit of the turnaround portion along the movement path to the second transport route portion while having the second transport unit end at the front in the movement direction.

Other exemplary embodiments and advantages of the present invention may be ascertained by reviewing the present disclosure and the accompanying drawing.

BRIEF DESCRIPTION OF THE DRAWINGS

The present invention will now be explained in more detail with reference to FIGS. 1 to 7, which show example, schematic, non-limiting, advantageous embodiments of the invention and in which:

FIG. 6 shows a transport device according to the invention in the form of a long-stator linear motor, comprising a transport route having a turnaround portion and a first closed transport route loop, and a transfer portion having a second closed transport route loop, and FIG. 7 shows a transport device according to the invention in the form of a long-stator linear motor, comprising an open transport route having a turnaround portion and a transfer portion.

DETAILED DESCRIPTION OF THE EMBODIMENTS

Figure 1:
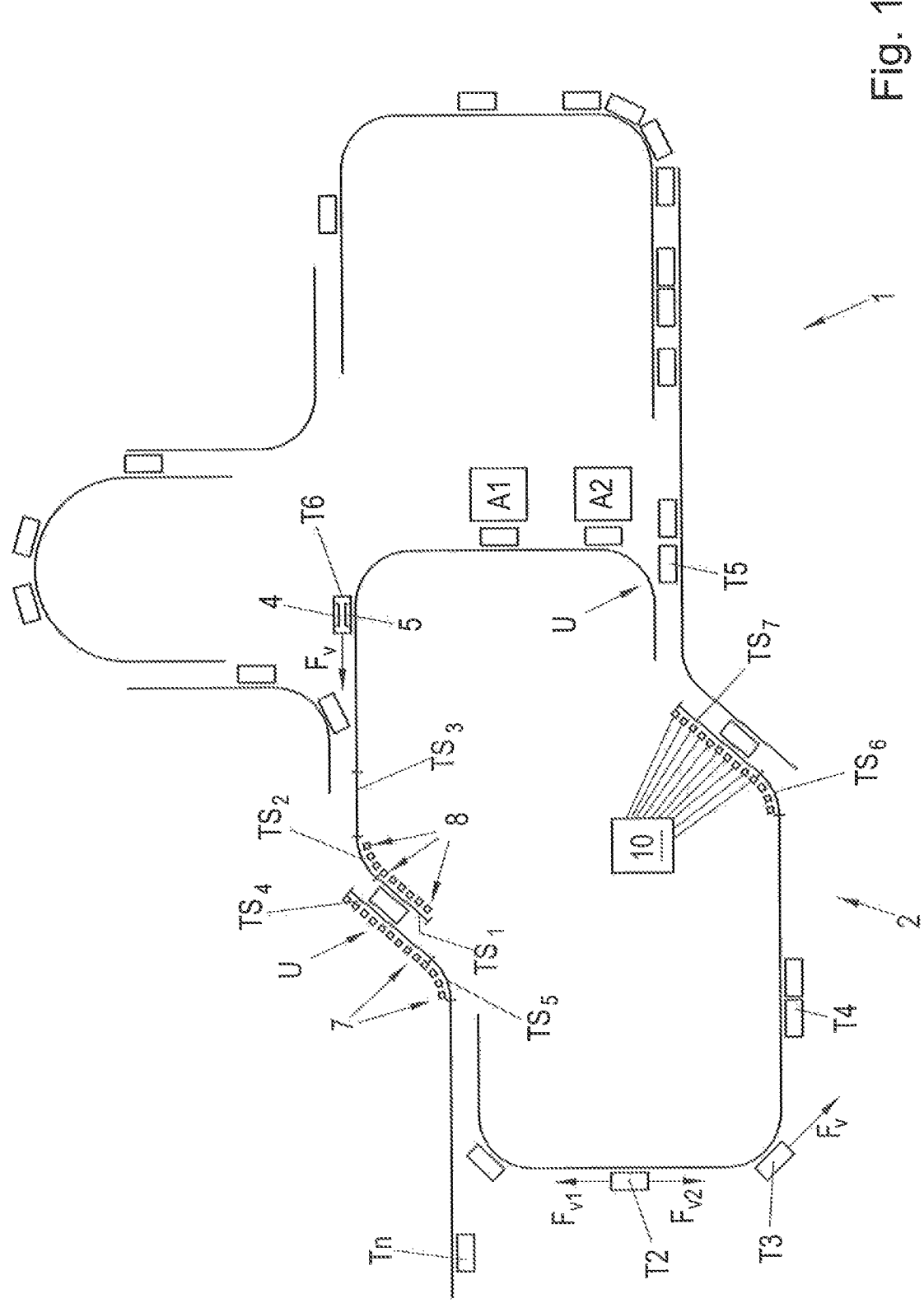
FIG. 1 shows the basic design of a transport device in the form of a long-stator linear motor.

FIG. 1 shows an example transport device 1 in the form of a long-stator linear motor. The transport device 1 consists of a plurality of transport segments $TS_k$ (in this case, k≥1 is an index that denotes all the transport segments $TS_1$, $TS_2$, $TS_3$, etc. present), of which only transport segments $TS_1$ . . . $TS_7$ have been shown for reasons of clarity. A transport segment $TS_k$ is arranged on each side of the transport route 2. The transport segments $TS_k$ form different route portions, for example a straight line, curves of different angles and radii, and switches, and can be combined very flexibly to form the transport route 2 of the transport device 1. Together, the transport segments $TS_k$ thus form the stationary transport route 2 along which the transport units Tn (in this case, n≥1 is an index that denotes all the transport units T1, T2, T3, T4, etc. present) can be moved. This modular design allows the transport device 1 to have a very flexible design. In the process, the transport segments $TS_k$ are of course arranged on a stationary support structure (not shown).

The transport device 1 is designed as a long-stator linear motor, in which each transport segment $TS_k$ forms a part of a long stator of the long-stator linear motor, in a manner known per se. Therefore, and as is known, a plurality of stationary electrical propelling coils 7, 8 forming the stator are arranged along the transport segments $TS_k$ (in FIG. 1, only indicated for the transport segments $TS_1$, $TS_2$, $TS_4$, $TS_5$, $TS_6$, $TS_7$ for reasons of clarity) and can interact with propelling magnets 4, 5 on the transport units T1 ... Tn (in FIG. 1, only indicated for the transport unit T6 for reasons of clarity) in order to generate a propelling force $F_V$. As has long been known, the propelling coils 7, 8 are actuated by a control unit 10 (only shown in FIG. 1) in order to apply the coil voltages necessary for the desired movement of the transport units Tn.

Along the transport route 2, there may also be route portions at which transport segments $TS_k$ are arranged on both sides and a transport unit Tn is moved between said segments (for example, the transport units $TS_1$, $TS_4$), If the transport unit Tn is equipped with propelling magnets 4, 5 on both sides (when viewed in the movement direction), the transport unit Tn can also interact simultaneously with the transport segments $TS_k$ arranged on both sides or with the propelling coils thereof 7, 8, As a result, a higher total propelling force $F_V$ can of course be generated. Depending on the movement direction in which a transport unit Tn is to be moved, the propelling coils 7, 8 can be actuated by the control unit 10 such that either a propelling force $F_{V1}$ in a first movement direction or a propelling force $F_{V2}$ in a second, 180° opposite movement direction can be generated.

A number of work stations Aj may also be arranged on the transport route 2, at which stations the transport units Tn are held, for example, in order to carry out a particular processing step on a component being conveyed by the transport unit. By way of example, FIG. 1 shows two work stations A1, A2.

It goes without saying that other guide elements (not shown here for reasons of clarity) such as rollers, wheels, sliding surfaces, guide magnets, etc. can also be provided on the transport unit Tn in order to guide the transport unit Tn along the transport route 2 and also to hold it, in particular even to hold it stationary. In the process, the guide elements of the transport unit Tn interact with the transport route 2 or the transport segment $TS_k$, e.g. by the guide elements being supported on the transport route, hooking into said route, sliding or rolling thereon, etc.

According to the invention, for the orientation of the transport unit 2 to be changed in the longitudinal direction, a turnaround portion W is provided in the transport route 2, as explained in more detail below with reference to FIG. 2.

Figure 2:
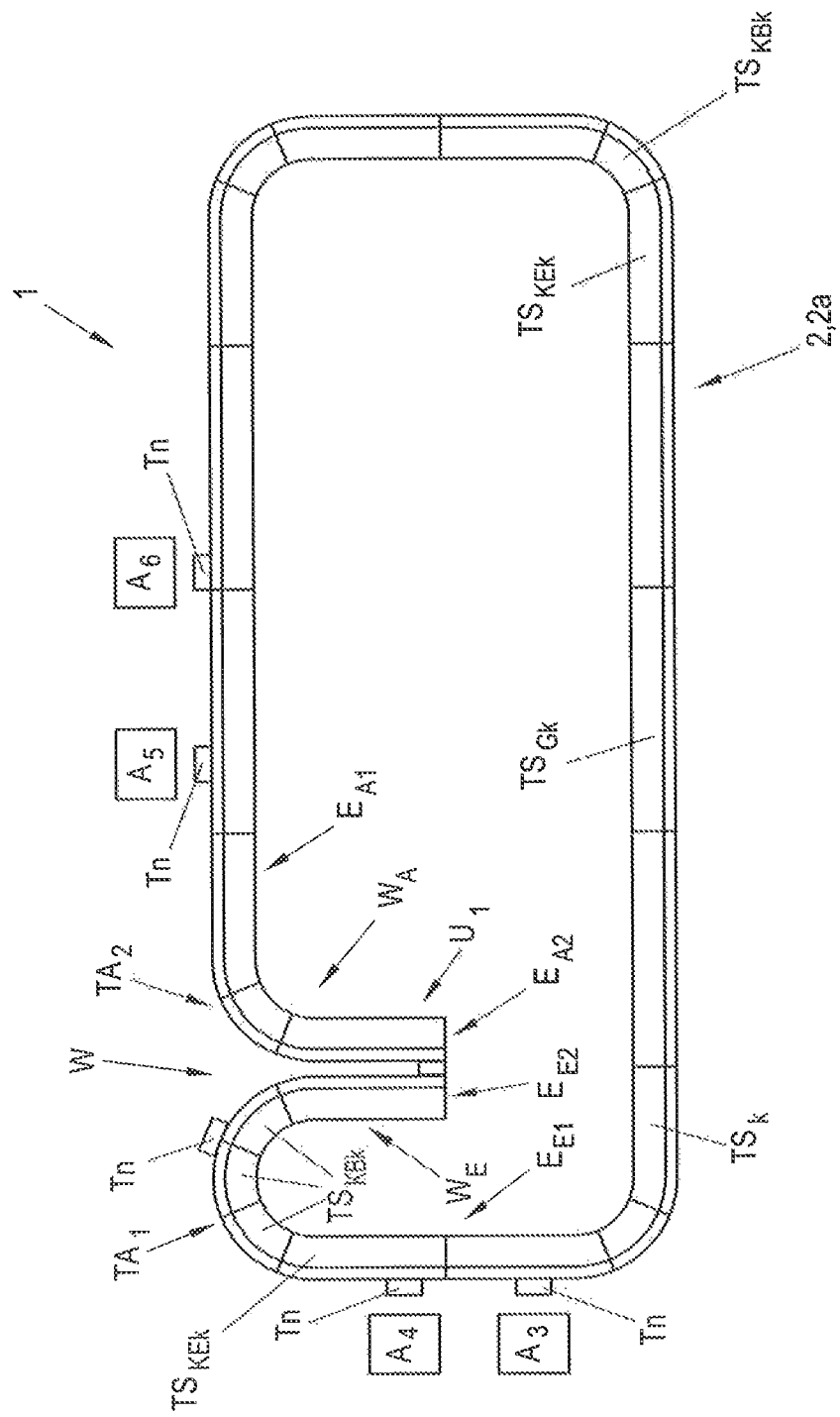
FIG. 2 shows a transport device according to the invention in the form of a long-stator linear motor, comprising a transport route having a turnaround portion and a first closed transport route loop.

In a known manner, FIG. 2 shows a transport device 1 in the form of a long-stator linear motor comprising a transport route 2 composed of a plurality of transport segments $TS_k$, and a plurality of transport units Tn, which can be moved along the transport route 2. In the example shown, the transport route 2 consists for example of three different types of transport segment $TS_k$: straight transport segments $TS_{Gk}$, curve entrance segments $TS_{KEk}$, and circular arc segments $TS_{KBk}$. It goes without saying that this selection is merely an example, and other or additional transport segments $TS_k$ could be used to form a transport route 2. As is known, propelling coils 7, 8 are arranged on each transport segment $TS_k$ and propelling magnets 4, 5 are arranged on either side of each transport unit Tn, as already explained with reference with FIG. 1. For reasons of clarity, these are not shown in FIG. 2.

Figure 3:
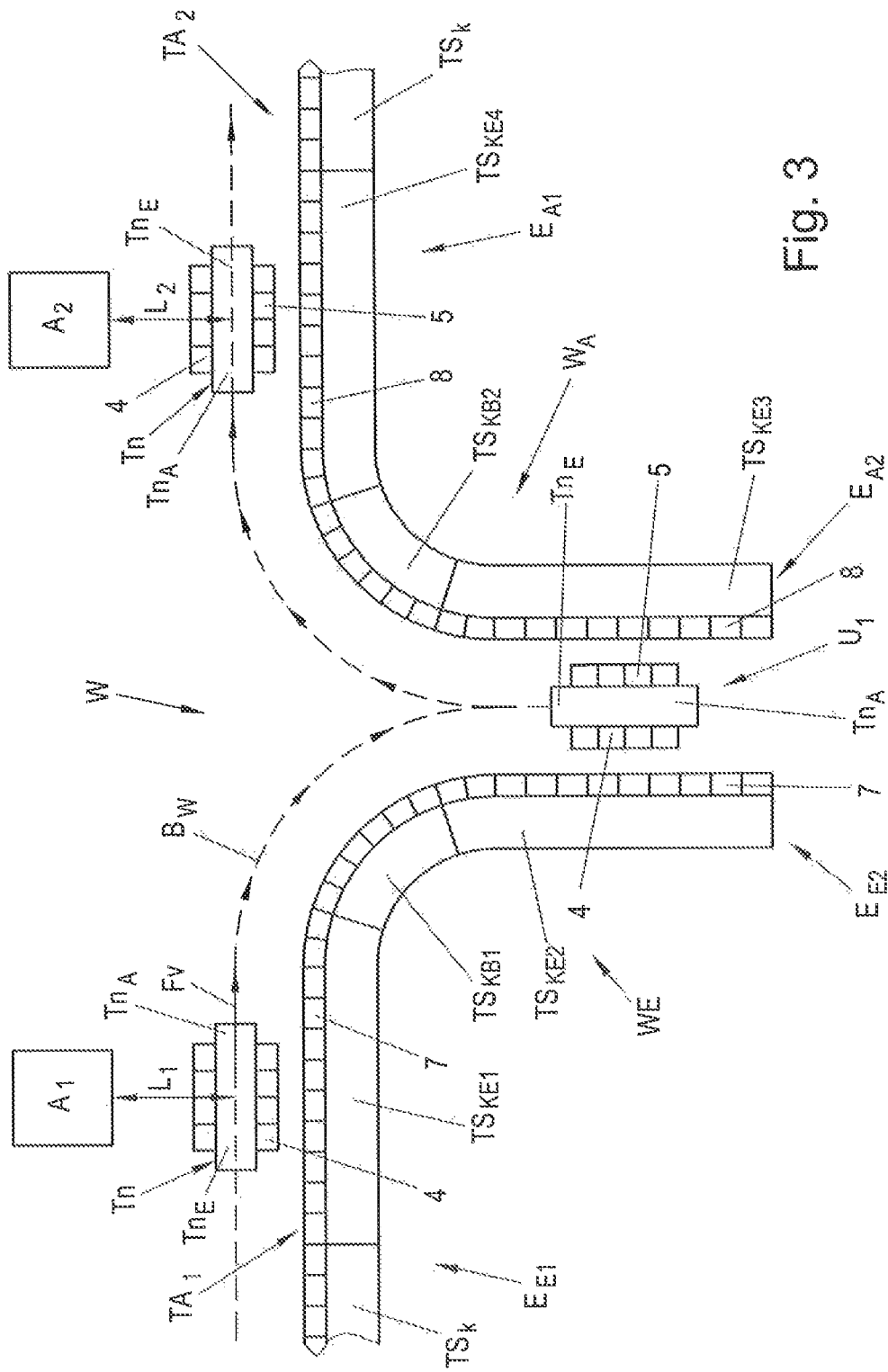
FIG. 3 is a detailed view of a turnaround portion.

According to the invention, the transport route 2 comprises a turnaround portion W, which is provided for changing the orientation of the transport unit Tn on the transport route 2 by 180° in the longitudinal direction. The turnaround portion W comprises an entrance $W_E$, which is connected to a first transport route portion $TA_1$ by a first entrance end $E_{E1}$, and a second, open entrance end $E_{E2}$, and comprises an exit $W_A$, which is connected to a second transport route portion $TA_2$ by a first exit end $E_{A1}$, and a second, open exit end $E_{A2}$. Within the meaning of the invention, "open" means that the transport unit Tn cannot be moved onward beyond the open end by means of the long-stator linear motor. The open end is thus a type of head-end station for the transport unit Tn. In the example shown, the first transport route portion $TA_1$ is connected to the second transport route portion $TA_2$ and thus forms a first closed transport route loop 2a. To be turned around, the transport unit Tn is first moved from a first transport route portion $TA_1$ to the entrance $W_E$ of the turnaround portion W in a first movement direction; the transport unit Tn is then transferred from the entrance $W_E$ to the exit $W_A$ of the turnaround portion W and subsequently from the exit $W_A$ of the turnaround portion W to the second transport route portion $TA_2$ in a second movement direction. The unit can of course be turned around in the opposite manner, too. FIG. 3 shows in detail how the transport unit Tn is turned around on the basis of an enlarged view of a turnaround portion W.

On both sides, the transport unit Tn comprises propelling magnets 4, 5, which interact with propelling coils 7, 8 of the transport segments $TS_k$ in order to generate a propelling force $F_V$. The dashed line denotes the movement path $B_W$ along which the transport unit Tn is moved when being turned around. The transport unit Tn is moved from a first transport route portion $TA_1$ to the entrance $W_E$ of the turnaround portion W, by a first transport unit end $Tn_A$ in the movement direction (indicated by the arrows on the movement path) and by a second transport unit end $Tn_E$ counter to the movement direction, by the propelling magnets 4 of the transport unit Tn interacting with the propelling coils 7 of the transport segments $TS_k$. In the example shown, the entrance $W_E$ of the turnaround portion W is designed as a 90° route portion consisting of two curve entrance segments $TS_{KE1}$, $TS_{KE2}$ and a circular arc segment $TS_{KB1}$. The entrance $W_E$ of the turnaround portion W could, however, also be designed as a 180° route portion, as shown in FIG. 2, or in any other manner.

A route portion need not be composed of individual transport segments $TS_k$; it could also be designed as a single transport segment $TS_k$. However, a modular design as shown, having standardized transport segments $TS_k$, is advantageous since a transport route 2 can thus be designed very flexibly using a small number of different transport segments $TS_k$.

At the first transfer position $U_1$ of the turnaround portion W, the transport unit Tn is transferred from the entrance $W_E$ to the exit $W_A$ of the turnaround portion W. The transfer position $U_1$ is distinguished in that the movement path of the entrance $W_E$ coincides with the movement path of the exit $W_A$. In practice, however, the movement paths need not coincide exactly; a small amount of play in the transverse direction is also permitted. In any case, though, the movement paths coinciding must make transfer from the entrance $W_E$ to the exit $W_A$ possible, as described below. In this context, "transfer" means that, at the transfer position $U_1$, the transfer unit Tn can interact with propelling coils of the entrance $W_E$ and/or the exit $W_A$ in order to move the transport unit Tn along said position. For this purpose, the movement of the transport unit Tn from the time of the transfer onward is made possible substantially by the propelling magnets 5 of the transport unit Tn interacting with the propelling coils 8 of the exit $W_A$; in the example shown, these are the propelling coils 8 of the curve entrance segment $TS_{KE3}$. The transport unit Tn is then moved along the movement path $B_W$ from the exit $W_A$ of the turnaround portion W to the second transport route portion $TA_2$ in an orientation (or movement direction) changed by 180°, i.e. having the second transport unit end $Tn_E$ in front in the movement direction, as shown by the arrows in FIG. 3. Turning the transport unit Tn around by 180° is always based on the movement direction of the transport unit Tn in the longitudinal direction of a transport segment $TS_k$ and not on the angle between the first and second transport route portions $TA_1$, $TA_2$. Between the first and second transport route portion $TA_1$, $TA_2$, there may of course be a different angle provided, for example if the entrance $W_E$ of the turnaround portion W is designed as a 60° arc instead of the 90° arc shown in FIG. 3.

By changing the orientation of the transport unit Tn in the manner according to the invention, it is possible, for example, to manipulate an item being moved by the transport unit Tn from a first side, e.g. the side of the transport unit Tn on which the propelling magnets 5 are arranged, at work stations $A_3$, $A_4$ (see FIG. 2), and, after the transport unit Tn has been turned around, to manipulate the item from a second opposite side, e.g. the side of the transport unit Tn on which the propelling magnets 4 are arranged, at work stations $A_5$, $A_6$, or vice versa. For this purpose, the work station need not be arranged at different points of the transport route 2 when viewed in the transverse direction, which is not always possible.

Preferably, the entrance $W_E$ and the exit $W_A$ of the turnaround portion W are designed in the form of 90° route portions, as shown in FIG. 3, or as 180° route portions, as shown in FIG. 2 on the basis of the entrance $W_E$. It is particularly advantageous if the 90° route portion, as described on the basis of FIG. 3, consists of two curve entrance segments $TS_{KEk}$ and a circular arc segment $TS_{KBk}$ therebetween, and the 180° route portion consists of two curve entrance segments $TS_{KEk}$ and a plurality of circular arc segments $TS_{KBk}$ therebetween (consisting of three circular arc segments $TS_{KBk}$ in the example shown in FIG. 2). In this configuration, together with a straight transport segment $TS_{Gk}$, a transport route 2 having just three different transport segments $TS_k$ can be designed very flexibly.

The turnaround portion W is designed such that the second entrance end $E_{E2}$ of the entrance $W_E$ and the second exit end $E_{A2}$ of the exit $W_A$ (i.e. the respective ends not connected to a transport route portion $TA^1$, $TA_2$) are formed as open ends. FIG. 2 shows the open entrance end $E_{E2}$ and the open exit end $E_{A2}$, wherein, as described, in order to be turned around the transport unit Tn can be moved from the first transport route portion $TA_1$ to the entrance $W_E$ of the turnaround portion W, transferred from the entrance $W_E$ to the exit $W_A$ of the turnaround portion W at the transfer position $U_1$, and moved from the exit $W_A$ to the second transport route portion $TA_2$. From the second transport route portion $TA_2$, the transport unit can be moved along the remainder of the transport route 2, which according to FIG. 2 is formed as a first closed transport route loop $2a$, back to the first transport route portion $TA_1$. However, the transport route 2 could of course also be designed to be open, as shown in FIG. 4.

Figure 4:
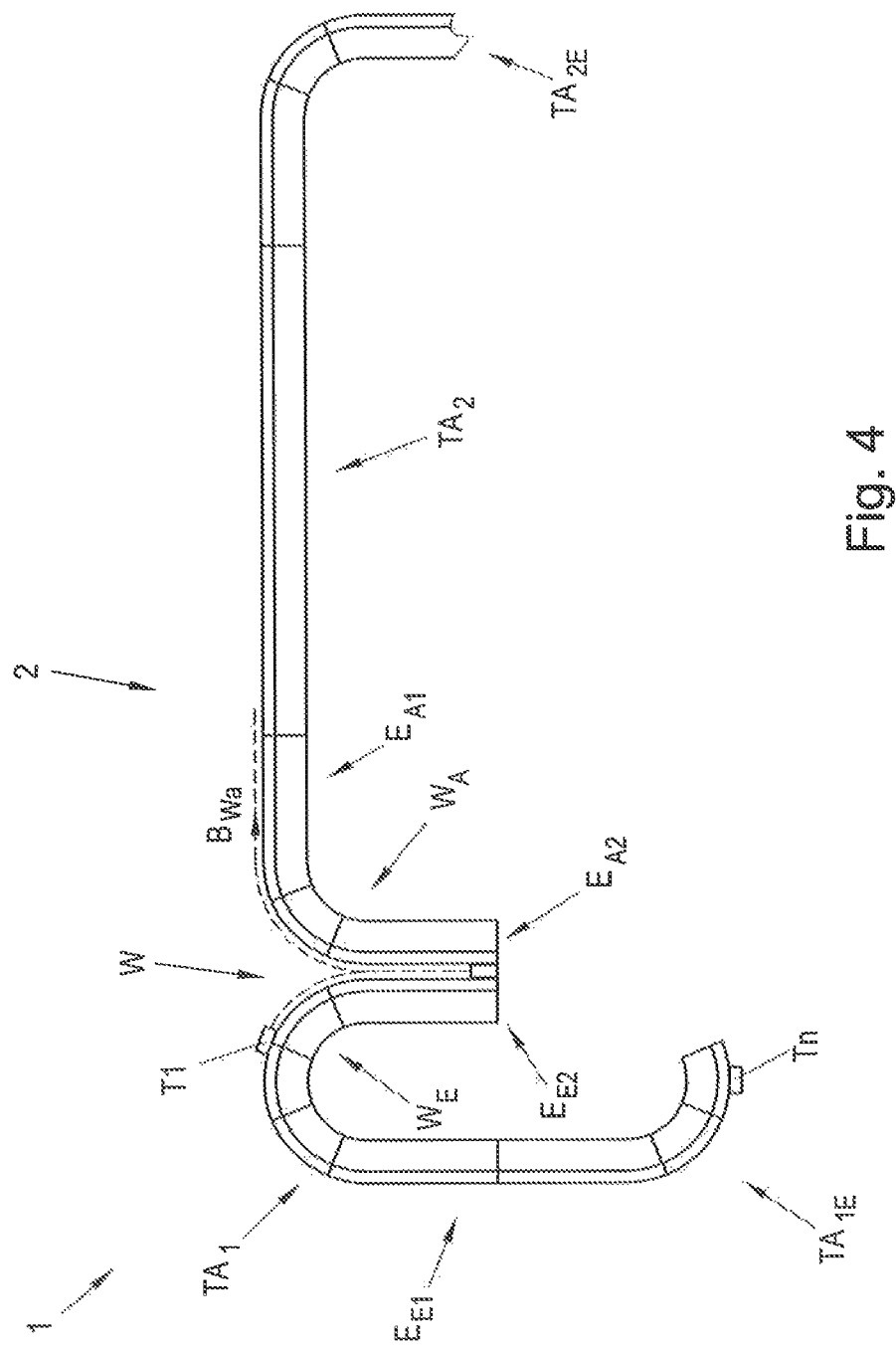
FIG. 4 shows a transport device according to the invention in the form of a long-stator linear motor, comprising an open transport route having a turnaround portion.

FIG. 4 shows an open transport route 2 comprising a turnaround portion W having an entrance $W_E$ and an exit $W_A$. The first entrance end $E_{E1}$ of the entrance $W_E$ of the turnaround portion W is connected to the first transport route portion $TA_1$, and the first exit end $E_{A1}$ of the exit $W_A$ of the turnaround portion W is connected to the second transport route portion $TA_2$. The first and second transport route portion $TA_1$, $TA_2$ each comprise an open end $TA_{1E}$, $TA_{2E}$. The transport unit Tn can be moved along the movement path $B_{Wa}$, the orientation of the transport unit Tn being changed according to the invention by 180° in the longitudinal direction in the turnaround portion W. It goes without saying that the movement along said movement path $B_{Wa}$ can also take place in the opposite direction, i.e. from the second transport route portion $TA_2$ to the first transport route portion $TA_1$.

Advantageously, the first transport route portion $TA_1$, which adjoins the entrance $W_E$ of the turnaround portion W, and the second transport route portion $TA_2$ of the transport route 2, which adjoins the exit $W_A$ of the turnaround portion W, comprise a coaxial movement path B for the transport unit Tn at least in some portions, as can be seen in FIG. 3. This can ensure, for example, that distances $L_1$, $L_2$ between the transport unit Tn and work stations $A_1$, $A_2$ are substantially the same before and after the turnaround portion W.

Figure 5:
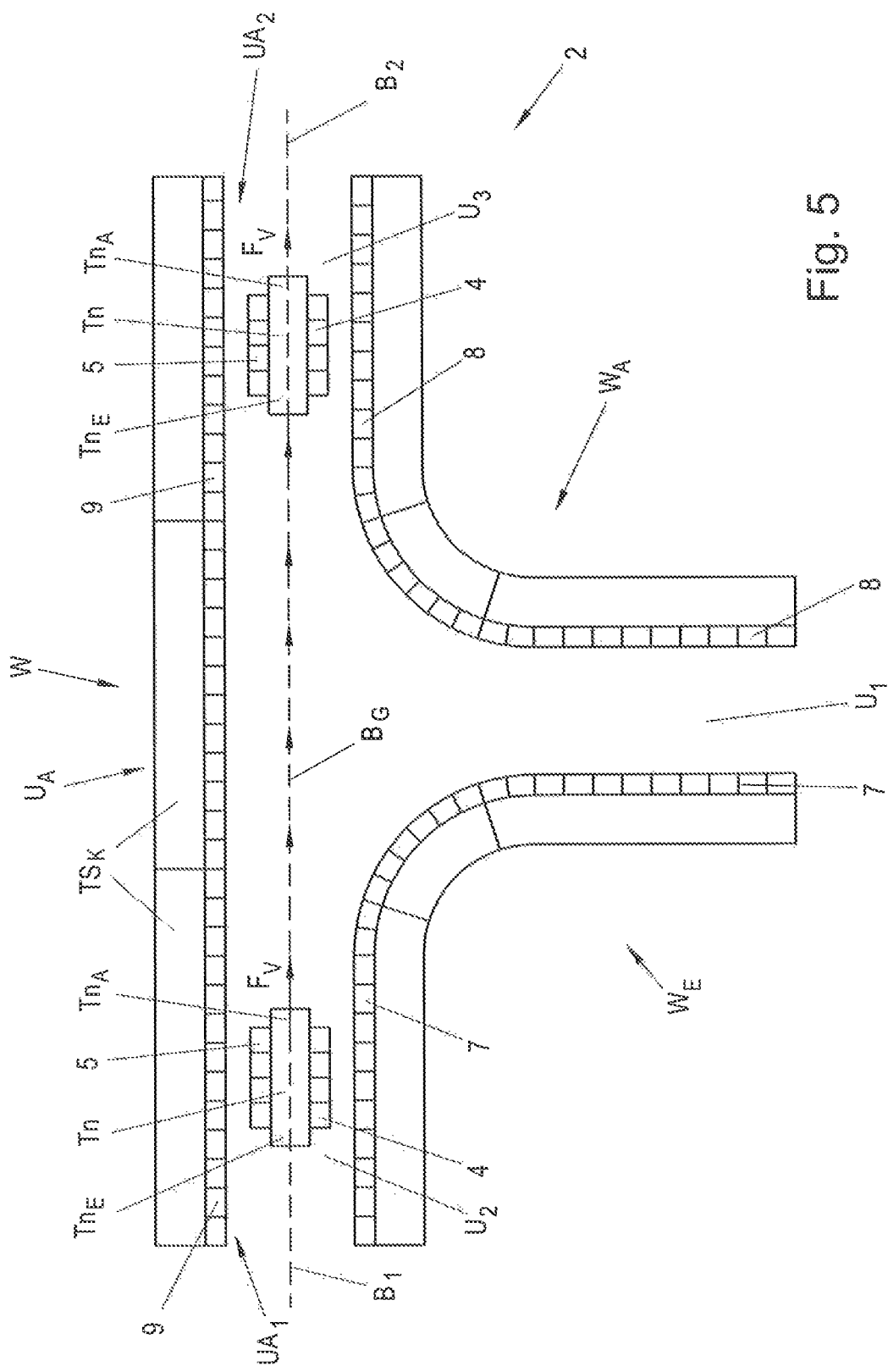
FIG. 5 is a detailed view of a turnaround portion having a transfer portion.

FIG. 5 shows another embodiment of the invention. In this case, in the region of the turnaround portion W, the transport route 2 comprises a transfer portion UA, which is provided to move the transport unit Tn from the first transport route portion $TA_1$ to the second transport route portion $TA_2$ without turning said unit around. The transfer portion UA comprises a first transfer route portion $UA_1$, which has a common movement path $B_1$ together with the first transport route portion $TA_1$ at least in some portions, and comprises a second transfer route portion $UA_2$, which has a common movement path $B_2$ together with the second transport route portion $TA_2$ at least in some portions, the transport unit Tn being able to be transferred from the first transport route portion $TA_1$ to the first transfer route portion $UA_1$ at a second transfer position $U_2$, moved in the longitudinal direction along the transfer portion UA to the second transport route portion $TA_2$, and transferred from the second transfer route portion $UA_2$ of the transfer portion UA to the second transport route portion $TA_2$ at a third transfer position $U_3$. In this embodiment, the turnaround portion W can thus not only be used to turn the transport unit Tn around, as described in detail on the basis of FIG. 3, but alternatively said transport unit Tn can be moved along the transfer portion UA from the first transport route portion $TA_1$ to the second transport route portion $TA_2$ without its orientation being changed, as denoted by the movement path $B_G$ for the straight travel in FIG. 5.

As shown, the transfer portion UA can be constructed from a plurality of transport segments $TS_k$, but could also comprise just one transport segment $TS_k$ extending at least partly across the two transport route portions $TA_1$, $TA_2$. During travel in a straight line, the orientation of the transport unit Tn in the longitudinal direction remains the same; in other words, at both the first transport route portion $TA_1$ and the second transport route portion $TA_2$, the first transport unit end $Tn_A$ of the transport unit Tn points in the movement direction and the second transport unit end $Tn_E$ points counter to the movement direction. It is important that the transfer route portion $UA_1$ of the transfer portion UA and the first transport route portion $TA_1$ have a common movement path $B_1$ in the region of the transfer position $U_2$, such that the transport unit Tn can be transferred from the first transport route portion $TA_1$ to the transfer portion UA. The same of course applies also to the third transfer position $U_3$, at which the transfer route portion $UA_2$ of the transfer portion UA and the second transport route portion $TA_2$ have a common movement path $B_2$. Similarly to the first transfer position $U_1$, a certain level of play is also permitted at the second and third transfer positions $U_2$, $U_3$, provided that the transport unit Tn can be reliably transferred.

Until the transfer unit Tn is transferred at the second transfer position $U_2$, the propelling force $F_V$ for moving the transport unit Tn is generated by the propelling magnets 4 of the transport unit Tn interacting with the propelling coils 7 of the first transport route portion $TA_1$; at the second transfer position $U_2$, the generation of the propelling force $F_V$ is taken over by the propelling magnets 5 in cooperation with the propelling coils 9 of the transport route portion $UA_1$ of the transfer portion UA. The exact control of the transfer is preferably carried out by a superordinate control unit 10 (not shown) (see FIG. 1). However, it goes without saying that the transfer need not be carried out at precisely one point, but rather the second transfer position $U_2$ can also be a region extending in the longitudinal direction over a particular distance along the movement path $B_1$ in which the transfer is carried out, e.g. continuously during the movement of the transport unit Tn. For this purpose, the generation of the propelling force $F_V$ is preferably not transferred abruptly, but rather steadily by the propelling force $F_V$ for example briefly being generated concurrently in the region of the second transfer position $U_2$, i.e. by the propelling magnets 4 interacting with the propelling coils 7 and the propelling magnets 5 interacting with the propelling coils 9. The transfer at either the first transfer position $U_1$ (if the transport unit Tn is to be turned around) or the third transfer position $U_3$ can of course be carried out in a similar manner. However, the detailed functioning of the transfer is not subject matter of the invention and can, for example, be taken from EP 3 109 998 A1.

According to another embodiment of the invention, the transfer portion UA of the turnaround portion W can form a second closed transport route loop 2b, as shown in FIG. 6, or a second open transport route loop 2b, as shown in FIG. 7, along which the transport unit Tn can be moved in the longitudinal direction. The transport route 2 in FIG. 6 comprises a turnaround portion W, the first transport route portion $TA_1$ forming a first transport route loop 2a together with the second transport route portion $TA_2$. In turn, the transfer portion UA of the turnaround portion W forms a second closed transport route loop 2b. The transport unit Tn can be moved along two movement paths $B_{Wa}$, $B_{Wb}$ in the region of the turnaround portion W, the transport unit being turned around on the movement path $B_{Wa}$ and not being turned around on the movement path $B_{Wb}$. When moving along the movement path $B_{Wa}$, the transport unit can either be moved further along the first closed transport route loop 2a, as denoted by the movement path $B_{2a}$, or can be transferred to the second closed transport route loop 2b at the third transfer position $U_3$ and moved further on the second closed transport route loop 2b, as denoted by the movement path $B_{2b}$.

The transport route 2 according to FIG. 7 is designed to be open and comprises a turnaround portion W. The first transport route portion $TA_1$ and the second transport route portion $TA_2$ each comprise an open end $TA_{1E}$, $TA_{2E}$. In turn, the transfer portion UA of the turnaround portion W forms a second open transport route loop 2b. In the example shown, the entrance $W_E$ of the turnaround portion W is designed as a 180° route portion and the exit $W_A$ of the turnaround portion W is designed as a 90° route portion. In this configuration of the transport route 2, the transport unit Tn can be moved along the two above-described movement paths $B_{Wa}$, $B_{Wb}$ in the region of the turnaround portion W, the transport unit being turned around on the movement path $B_{Wa}$ and not being turned around on the movement path $B_{Wb}$.

When moving along the movement path $B_{Wa}$, the transport unit can either be moved further along the transport route loop 2a, as denoted by the movement path $B_{2a}$, or can be transferred to the second open transport route loop 2b at the third transfer position $U_3$ and moved further on the transport route loop 2b, as denoted by the movement path $B_{2b}$. It is clear that a very flexible transport device 1 is achieved by means of the turnaround portion W according to the invention. It goes without saying that many other configurations having a plurality of turnaround portions W and transfer portions UA are conceivable.

What is claimed:

1. A transport device in the form of a long-stator linear motor, comprising:
   a transport route comprising at least a first transport route portion and a second transport route portion; and
   at least one transport unit, which is movable in a longitudinal direction along the transport route,
   wherein the transport route has a turnaround portion, which is configured to change an orientation of the transport unit by 180° in the longitudinal direction along the transport route, the turnaround portion having an entrance that includes a first entrance end connected to the first transport route portion and a second, open entrance end, and an exit that includes a first exit end connected to the second transport route portion and a second, open exit end,
   wherein the entrance and the exit of the turnaround portion are arranged to form, at least in some portions, a common movement path in a region of a first transfer position, along which the transport unit is movable; and
   wherein, for changing the orientation of the transport unit by 180° in the longitudinal direction, the transport unit is movable from the first transport route portion to the entrance of the turnaround portion, is transferable, at the first transfer position, from the entrance of the turnaround portion to the exit of the turnaround portion, and is movable from the exit of the turnaround portion to the second transport route portion, and
   wherein the first transport route portion, which adjoins the entrance of the turnaround portion, and the second transport route portion of the transport route, which adjoins the exit of the turnaround portion are arranged to form, at least in some portions, a coaxial movement path along which the transport unit is movable.

2. The transport device according to claim 1, wherein the entrance of the turnaround portion is designed as one of a 90° or 180° route portion and the exit of the turnaround portion is designed as one of a 90° or 180° route portion,
   wherein at least one of:
   one end of the one of the 90° or 180° route portion of the entrance being connected to the first transport route portion and the other end having an open end; or
   one end of the one of the 90° or 180° route portion of the exit being connected to the second transport route portion and the other end having an open end.

3. The transport device according to claim 2, wherein each 90° or 180° route portion consists of two curve entrance segments that each have one straight end portion and one curved end portion, and at least one circular arc segment, which connects the curved end portions of the two curve entrance segments, and wherein at least one of:
a first of the two curve entrance segments of the one of 90° or 180° route portion of the entrance is connected to the first route portion by the straight end portion and a second of the two curve entrance segments has an open end at the straight end portion; or a first of the two curve entrance segments of the one of the 90° or 180° route portion of the exit is connected to the second transport route portion by the straight end portion and a second of the two curve entrance segments has an open end at the straight end portion.

4. The transport device according to claim 1, wherein the entrance of the turnaround portion and the exit of the turnaround portion are connected and form a first closed transport route loop.

5. The transport device according to claim 1, wherein the transport route comprises at least two turnaround portions.

6. The transport device according to claim 1, wherein, in the region of the turnaround portion, the transport route comprises a transfer portion, which is configured for moving the transport unit from the first transport route portion to the second transport route portion without changing the orientation of the transport unit by 180° in the longitudinal direction, wherein the transfer portion has a first route portion that has a common movement path together with the first transport route portion at least in some portions, and has a second route portion that has a common movement path together with the second transport route portion at least in some portions, wherein the transport unit is transferable from the first transport route portion to the transfer portion at a second transfer position, is movable in the longitudinal direction along the transfer portion to the second transport route portion, and is transferable from the transfer portion to the second transport route portion at a third transfer position.

7. The transport device according to claim 6, wherein the transfer portion forms one of an open or closed transport route loop, along which the transport unit is movable.

8. The transport device according to claim 1, wherein, prior to changing the orientation of the transport unit by 180° in the longitudinal direction along the transport route, a first side of the transport unit is adjacent a first side of the transport route, and after changing the orientation of the transport unit by 180° in the longitudinal direction along the transport route, a second side of the transport unit, which is opposite the first side, is adjacent the first side of the transport route.

9. A method for turning around a transport unit of a transport device in the form of a long-stator linear motor comprising a transport route having at least a first transport route portion and a second transport route portion, comprising:

moving the transport unit in a longitudinal direction along the transport route, changing an orientation of the transport unit by 180° in the longitudinal direction along the transport route in a turnaround portion of the transport route, the turnaround portion including an entrance having a first entrance end connected to the first transport route portion and a second open entrance end and an exit having a first exit end connected to the second transport route portion and a second open exit end, wherein the entrance and the exit of the turnaround portion are configured to form, at least in some portions, a common movement path in a region of a first transfer position, along which the transport unit is movable, and wherein, the changing of the orientation of the transport unit by 180° in the longitudinal direction along the transport route in the turnaround portion comprises moving the transport unit from the first transport route portion to the entrance of the turnaround portion while a first transport unit end of the transport unit points in the movement direction and a second transport unit end of the transport unit points counter to the movement direction, transferring the transport unit from the entrance to the exit of the turnaround portion at the first transfer position, and moving the transport unit from the exit of the turnaround portion along the movement path to the second transport route portion while the second transport unit end of the transport unit is oriented at a front of the transport unit to point in the movement direction.

10. The method according to claim 9, wherein one of a 90° or 180° route portion is provided as the entrance of the turnaround portion and one of a 90° or 180° route portion is provided as the exit of the turnaround portion, wherein at least one of:
one end of the one of the 90° or 180° route portion of the entrance being connected to the first transport route portion and the other end having an open end; or one end of the one of the 90° or 180° route portion of the exit being connected to the second transport route portion and the other end having an open end.

11. The method according to claim 10,
wherein each 90° or 180° route portion consists of two curve entrance segments that each have one straight end portion and one curved end portion, and at least one circular arc segment, which connects the curved end portions of the two curve entrance segments, and wherein the straight end portion of one of the two curve entrance segments of the 90° or 180° route portion is connected to one of the first or second transport route portion and an open end is provided at the straight end portion of the other of the two curve entrance segments.

12. The method according to claim 9, wherein the first transport route portion, which adjoins the entrance of the turnaround portion, and the second transport route portion of the transport route, which adjoins the exit of the turnaround portion are arranged to form, at least in some portions, a coaxial movement path, along which the transport unit is movable.

13. The method according to claim 9, wherein the entrance of the turnaround portion and the exit of the turnaround portion are connected to form a first closed transport route loop.

14. The method according to claim 9, wherein at least two turnaround portions are provided on the transport route.

15. The method according to claim 9, wherein a transfer portion, which is arranged along the transport route and in a region of the turnaround portion, is configured so that the transport unit is movable from the first transport route portion to the second transport route portion without changing the orientation of the transport unit by 180° in the longitudinal direction, wherein, the transfer portion includes a first transfer route portion, which has, at least in some portions, a common movement path with the first transport route portion, and a second transfer route portion, which has, at least in some portions, a common movement path with the second transport route portion, and wherein, in moving the transport unit from the first route portion to the second route portion without changing the orientation of the transport unit by 180° in the longitudinal direction, the transport unit is transferred from the first transport route portion to the transfer portion at a second transfer position, the transport unit is moved in the longitudinal direction along the transfer portion to the second transport route portion, and the transport unit is transferred from the transfer portion to the second transport route portion at a third transfer position.

16. The method according to claim 15, wherein one of an open or closed transport route loop along which the transport unit is movable in the longitudinal direction is formed as the transfer portion.

17. The method according to claim 9, wherein, prior to changing the orientation of the transport unit by 180° in the longitudinal direction along the transport route, a first side of the transport unit is adjacent a first side of the transport route, and after changing the orientation of the transport unit by 180° in the longitudinal direction along the transport route, a second side of the transport unit, which is opposite the first side, is adjacent the first side of the transport route.

* * * * *